US009092758B2

(12) United States Patent
Ito

(10) Patent No.: US 9,092,758 B2
(45) Date of Patent: Jul. 28, 2015

(54) SERVICE PROVIDING APPARATUS, INFORMATION PROCESSING SYSTEM AND METHODS

(71) Applicant: CANON KABUSHIKI KAISHA, Tokyo (JP)

(72) Inventor: Naoki Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/644,027

(22) Filed: Oct. 3, 2012

(65) Prior Publication Data

US 2013/0110769 A1 May 2, 2013

(30) Foreign Application Priority Data

Oct. 27, 2011 (JP) ................................ 2011-236476

(51) Int. Cl.
*G06Q 10/10* (2012.01)
*G06F 17/24* (2006.01)
*G06F 17/30* (2006.01)

(52) U.S. Cl.
CPC .............. *G06Q 10/10* (2013.01); *G06F 17/241* (2013.01); *G06F 17/30292* (2013.01)

(58) Field of Classification Search
CPC . G06F 17/241; G06F 17/40; G06F 17/30292; G06Q 50/01
USPC ........................................................ 707/609
See application file for complete search history.

(56) References Cited

U.S. PATENT DOCUMENTS

| 6,301,586 | B1 * | 10/2001 | Yang et al. ............. 707/999.104 |
|---|---|---|---|
| 7,464,336 | B2 | 12/2008 | Nakamoto et al. |
| 8,380,786 | B2 * | 2/2013 | Hoffert et al. ................. 709/203 |
| 2006/0161838 | A1 * | 7/2006 | Nydam et al. ................ 715/512 |
| 2009/0225788 | A1 * | 9/2009 | Kephart et al. ............... 370/503 |
| 2009/0249224 | A1 * | 10/2009 | Davis et al. .................... 715/753 |
| 2009/0271524 | A1 * | 10/2009 | Davi et al. ...................... 709/231 |
| 2010/0095198 | A1 * | 4/2010 | Bultrowicz et al. ........... 715/234 |
| 2010/0241968 | A1 * | 9/2010 | Tarara et al. ................... 715/751 |
| 2011/0113320 | A1 * | 5/2011 | Neff et al. ...................... 707/827 |
| 2011/0161409 | A1 * | 6/2011 | Nair et al. ..................... 709/203 |
| 2012/0036423 | A1 * | 2/2012 | Haynes et al. ................ 715/230 |
| 2012/0151320 | A1 * | 6/2012 | McClements, IV .......... 715/230 |
| 2012/0159635 | A1 * | 6/2012 | He et al. ........................... 726/26 |
| 2012/0221687 | A1 * | 8/2012 | Hunter et al. ................. 709/219 |
| 2012/0284618 | A1 * | 11/2012 | Bailor et al. .................. 715/255 |
| 2013/0097481 | A1 * | 4/2013 | Kotler et al. .................. 715/230 |
| 2013/0124978 | A1 * | 5/2013 | Horns et al. .................. 715/243 |
| 2013/0198602 | A1 * | 8/2013 | Kokemohr .................... 715/233 |
| 2014/0033015 | A1 * | 1/2014 | Shaver ......................... 715/233 |

FOREIGN PATENT DOCUMENTS

JP 2003-091474 A 3/2003

* cited by examiner

*Primary Examiner* — Rehana Perveen
*Assistant Examiner* — Tiffany Thuy Bui
(74) *Attorney, Agent, or Firm* — Fitzpatrick, Cella, Harper & Scinto

(57) ABSTRACT

An information processing system and a service providing apparatus store an electronic file transmitted by an information processing apparatus, receive comments posted to the electronic file, manage the comments with arranged in a time order, and insert the comments into the electronic file. When downloading of the electronic file is instructed, the information processing system and service providing apparatus output the electronic file into which the comments have been inserted.

14 Claims, 11 Drawing Sheets

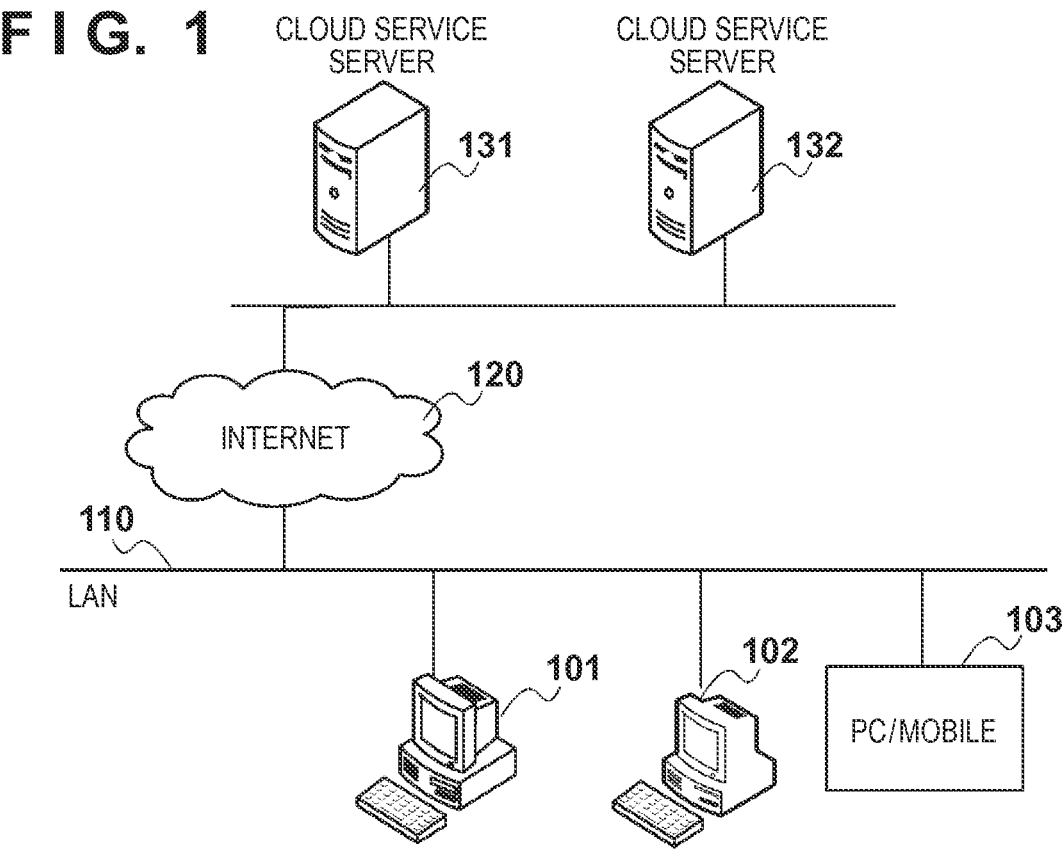
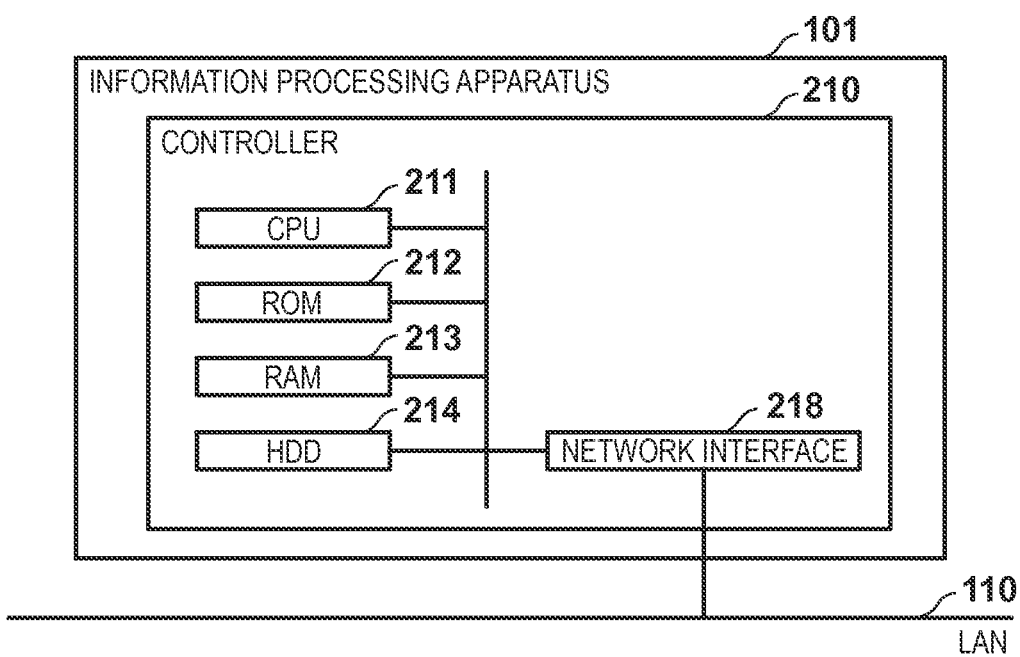

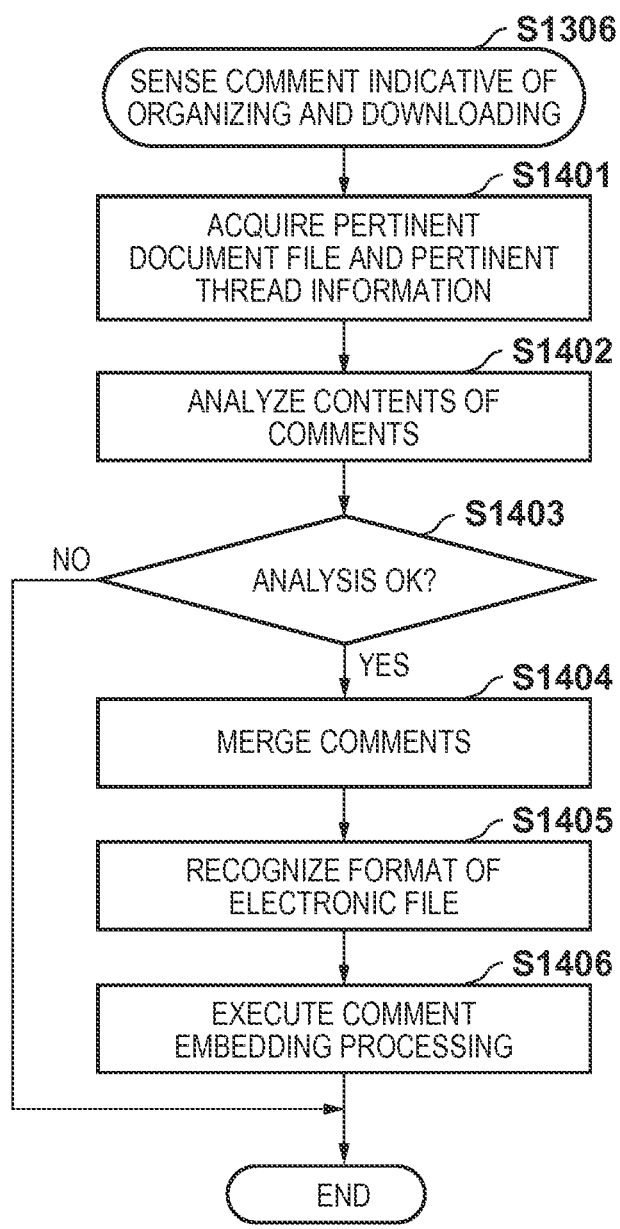

SERVICE PROVIDING APPARATUS, INFORMATION PROCESSING SYSTEM AND METHODS

BACKGROUND OF THE INVENTION

1. Field of the Invention

The present invention relates to a service providing apparatus that includes a Web service apparatus having a microblog function, and an information processing system including the service providing apparatus, and to a method of controlling the apparatus and system.

2. Description of the Related Art

In recent years a cloud computing system has come into practical use as a system configuration to provide services that utilizes the Internet. A user is capable of utilizing the services provided by the cloud computing system, which are referred to as "cloud services", merely by preparing the minimum necessary connection environment without the need to prepare hardware resources such as a server. An example of a cloud service already in practice is a CRM (Customer Relationship Management) system for carrying out customer management and business assistance. Another example of a cloud service is a document management service which provides a storage and management function for storing and managing electronic files.

A service that provides a microblog function is also available as a communication tool. A microblog function is a short-blog function that allows a user having an account with the service to post short sentences on the order of 100 to 200 characters, referred to as "microposts", as messages and comments. The term "user" referred to here is not limited to an actual user (human being) and is meant to include a printer or a cloud-service object or application such as a cooperative service, etc. A unique identifier is assigned to each message and comment posted by a user. With the microblog function, the user registers a message, thereby creating a "timeline" that enables comments relating to the registered message to be registered, displayed and managed in the form of a list. The user who has registered a message and other users exchange information and communicate by registering, as comments, related information on the timeline. Each user account also has a function for managing the profile of the user so that a user can ascertain who the communicating party is. For example, information such as user name, contact information (email address, telephone number, residential address and the like) and affiliated group is managed.

The CRM services provided as cloud services also provide a microblog function as a communication tool used when conducting an activity. These cloud services improve user convenience by linking customer information and business discussions with messages and comments. Also provided among CRM services is a file sharing function that enables files to be shared between users and that makes possible the storage, editing, updating and look-up of files. For example, Salesforce.com is available, and Chatter is equivalent to a microblog function currently available. Document and File are representative of file sharing functions.

Information processors continue to be provided with higher performance and greater functionality. Recently developed information processors not only have basic functions such as scan and print functions for digitizing and printing paper documents but are also equipped with a network interface. An information processing apparatus equipped with a network interface provides various solutions by cooperating with external systems and external services connected via a network. For example, an information processing apparatus equipped with a network interface makes it possible to transmit an electronic file, which has been formed by scanning a paper document, to a cloud document managing service, where the document is then archived. Further, such an apparatus makes it possible to attach an electronic file to email and to transmit the result to the other party.

Further, Japanese Patent Laid-Open No. 2003-91474, for example, describes a technique that enables a targeted file to be downloaded automatically from a Web server via the Internet. Japanese Patent Laid-Open No. 2003-91474 describes a communication apparatus connected to the Internet via a communication line and having a function for downloading files from the Internet autonomously.

Consider a case where an electronic file is shared by users through a cloud service in an environment in which an activity is conducted utilizing a microblog function provided by the cloud service. Even if users write messages and comments regarding the electronic file, an electronic file in which the written content is reflected cannot be acquired.

SUMMARY OF THE INVENTION

An aspect of the present invention is to eliminate the above-mentioned problems with the conventional technology.

A feature of the present invention is to provide a technique which, when an electronic file is shared in an environment that utilizes a microblog function, allows comments regarding the electronic file to be reflected in the electronic file.

According to an aspect of the present invention, there is provided a service providing apparatus comprising: a storing unit configured to store an electronic file transmitted by an information processing apparatus; a reception unit configured to receive comments posted to the electronic file; a management unit configured to manage the comments with arranged in a time order; a insertion unit configured to insert the comments into the electronic file; and an output unit configured to output the electronic file into which the comments have been inserted, in a case that downloading of the electronic file is instructed.

According to an aspect of the present invention, there is provided an information processing system comprises: a storage unit configured to store an electronic file transmitted by an information processing apparatus; a reception unit configured to receive comments posted to the electronic file; a management unit configured to manage the comments with arranged in a time order; a request unit configured to request inserting the comments into the electronic file, in a case that downloading of the electronic file is instructed; and an output unit configured to output the electronic file into which the comments have been inserted.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a diagram illustrating the overall configuration of a computer system according to an embodiment of the present invention;

FIG. 2 is a block diagram illustrating the hardware configuration of an information processing apparatus according to an embodiment;

FIG. 14 is a flowchart for describing the processing at steps S1306 to S1309 in the flowchart of FIG. 13 according to the third embodiment.

DESCRIPTION OF THE EMBODIMENTS

Figure 3:
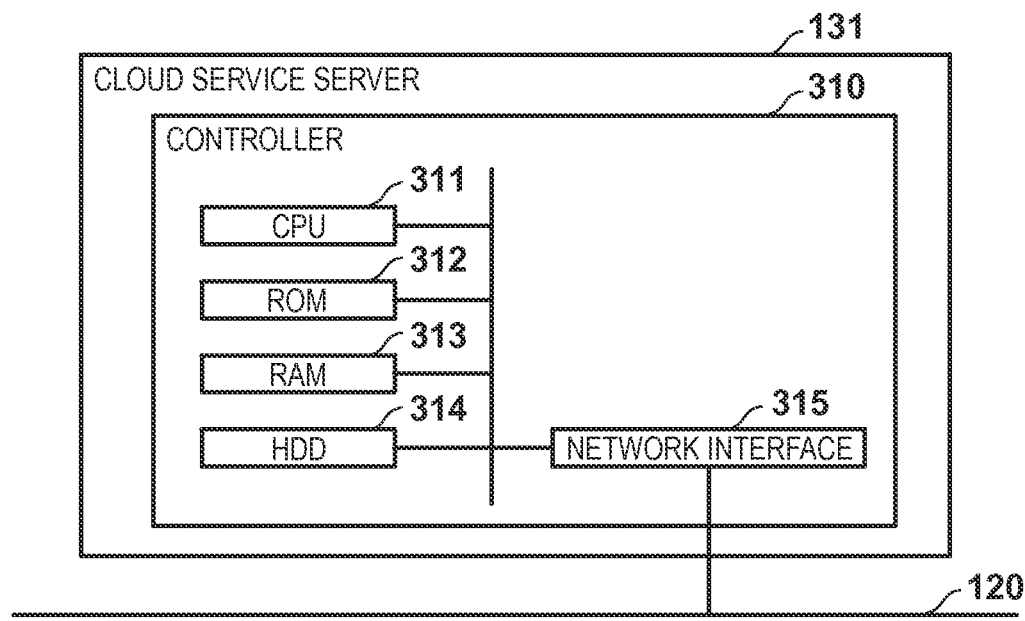
FIG. 3 is a block diagram illustrating the hardware configuration of a cloud service server according to an embodiment.

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

FIG. 1 is a diagram illustrating the overall configuration of a computer system according to an embodiment of the present invention.

As shown in FIG. 1, an information processing apparatus 101 and other devices such as a personal computer (PC) 102 and a PC/mobile 103 have been connected to a LAN 110. The LAN 110 is connected to Internet 120 and is also connected via the Internet 120 to cloud service servers 131 and 132, which are providing cloud services. Although the information processing apparatus 101, personal computer 102 and PC/mobile 103 have been connected to the LAN 110, this does not impose a limitation as it is also possible to connect these to the cloud service server 131 and cloud service server 132.

FIG. 2 is a block diagram illustrating the hardware configuration of the information processing apparatus 101 according to the embodiment.

A controller 210 that includes a CPU 211 controls the overall operation of the information processing apparatus 101. In accordance with a boot program stored in a ROM 212, the CPU 211 expands the operating system, programs and the like, which have been installed on a hard-disk drive 214, in a RAM 213. The CPU 211 controls the overall operation of the information processing apparatus 101 by executing the programs expanded in the RAM 213. The RAM 213 is used as the main memory of the CPU 211 and as a temporary storage area such as a work area. The hard-disk drive 214 stores image data, various programs and various information tables. A network interface 218 connects the controller 210 to the LAN 110. The network interface 218 sends and receives image data and information to and from the personal computers 102, 103 on LAN 110 or to and from external devices (the cloud service server 131 or cloud service server 132, for example) via the Internet 120.

The hardware configuration of the personal computers 102, 103 in FIG. 1 is similar to that of the information processing apparatus 101 and need not be described again.

FIG. 3 is a block diagram illustrating the hardware configuration of the cloud service server 131 according to the embodiment.

A controller 310 that includes a CPU 311 controls the overall operation of the cloud service server 131. The CPU 311 executes a boot program stored in a ROM 312, reads out a control program that has been installed on a hard-disk drive 314, expands the program in a RAM 313 and runs this program, thereby executing various control processes. The RAM 313 is used as the main memory of the CPU 311 and as a temporary storage area such as a work area. The hard-disk drive 314 stores image data, various programs and various information tables described later. A network interface 315 connects the controller 310 to the Internet 120. The network interface 315 sends and receives various information to and from other devices on the Internet 120.

The configuration of the cloud service server 132 is similar to that of the cloud service server 131 described in FIG. 3 and need not be described again.

Figure 4:
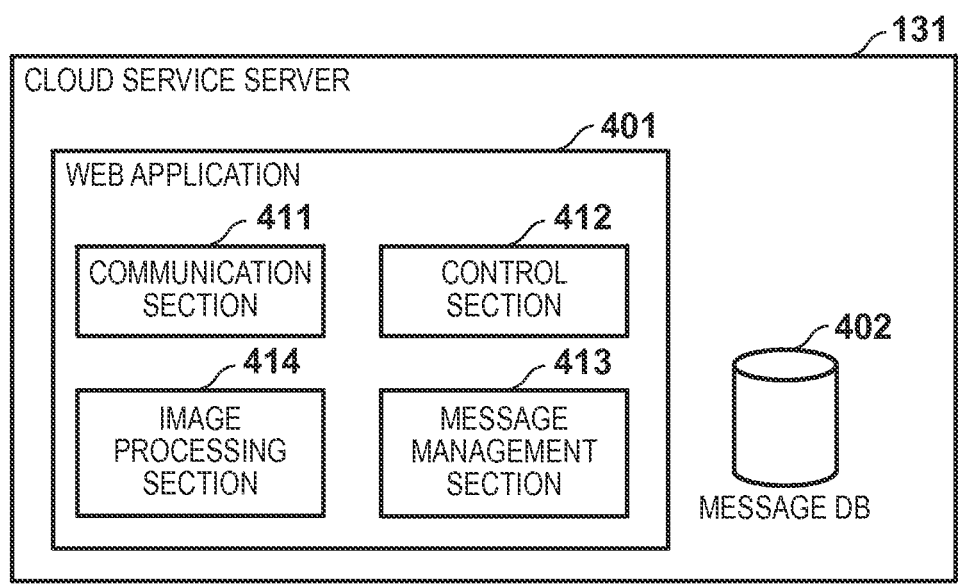
FIG. 4 is a functional block diagram for describing the software configuration of a cloud service server according to an embodiment.

FIG. 4 is a functional block diagram for describing the software configuration of the cloud service server 131 according to the embodiment. The software configuration of the cloud service server 132 is similar and need not be described.

The functional sections shown in FIG. 4 are implemented as a result of the control program being executed by the CPU 311 possessed by the cloud service server 131. The cloud service server 131 has a Web application 401 and a message database 402 (referred to as a "message DB" below). The Web application 401 is one for providing a CRM service or the like. In this embodiment it is assumed that the Web application 401 has been provided with a microblog function. The Web application 401 has a communication section 411, a control section 412, a message management section 413 and an image processing section 414.

The communication section 411 receives a request from the information processing apparatus 101 and transmits the content of the request to the control section 412. Furthermore, the communication section 411 accepts from the control section 412 the result of processing the request, creates data that is in response to the request and transmits the response to the information processing apparatus 101.

In accordance with the request content transmitted from the communication section 411, the control section 412 extracts messages or comments contained in the request and requests the message management section 413 to execute processing for registering the messages or comments. Further, the image processing section 414 recognizes the format of the electronic file of the registered messages or comments and determines the method of message or comment insertion into the file. The image processing section 414 further determines whether the registered messages or comments were implemented with respect to the electronic file. If it is determined that the messages or comments are ones regarding the electronic file received by the communication section 411, then the image processing section 414 executes processing for organizing the messages or comments. A function available as a method of organizing comments only merges comments or recognizes whether a comment has an entry regarding the number of pages of the electronic file and, with regard to a comment in which the number of pages has been recognized, inserts a message into the relevant pages.

The message management section 413 receives messages or comments transmitted from the control section 412 and stores them in the message DB 402. Further, in response to a request from the control section 412, the message management section 413 acquires registered messages and comments from the message DB 402 and transmits them to the control section 412.

The image processing section 414 executes image processing and conversions such as character recognition, document analysis and bitmap-image conversion. It should be noted that such image processing and conversions can be implemented using well-known techniques.

Although the functional blocks of the information processing apparatus 101 and personal computers 102 and 103 are not particularly illustrated, the information processing apparatus 101 and personal computers 102, 103 each have at least a Web browser for exchanging information with the Web application 401 and for displaying screens.

[First Embodiment]

Figure 5:
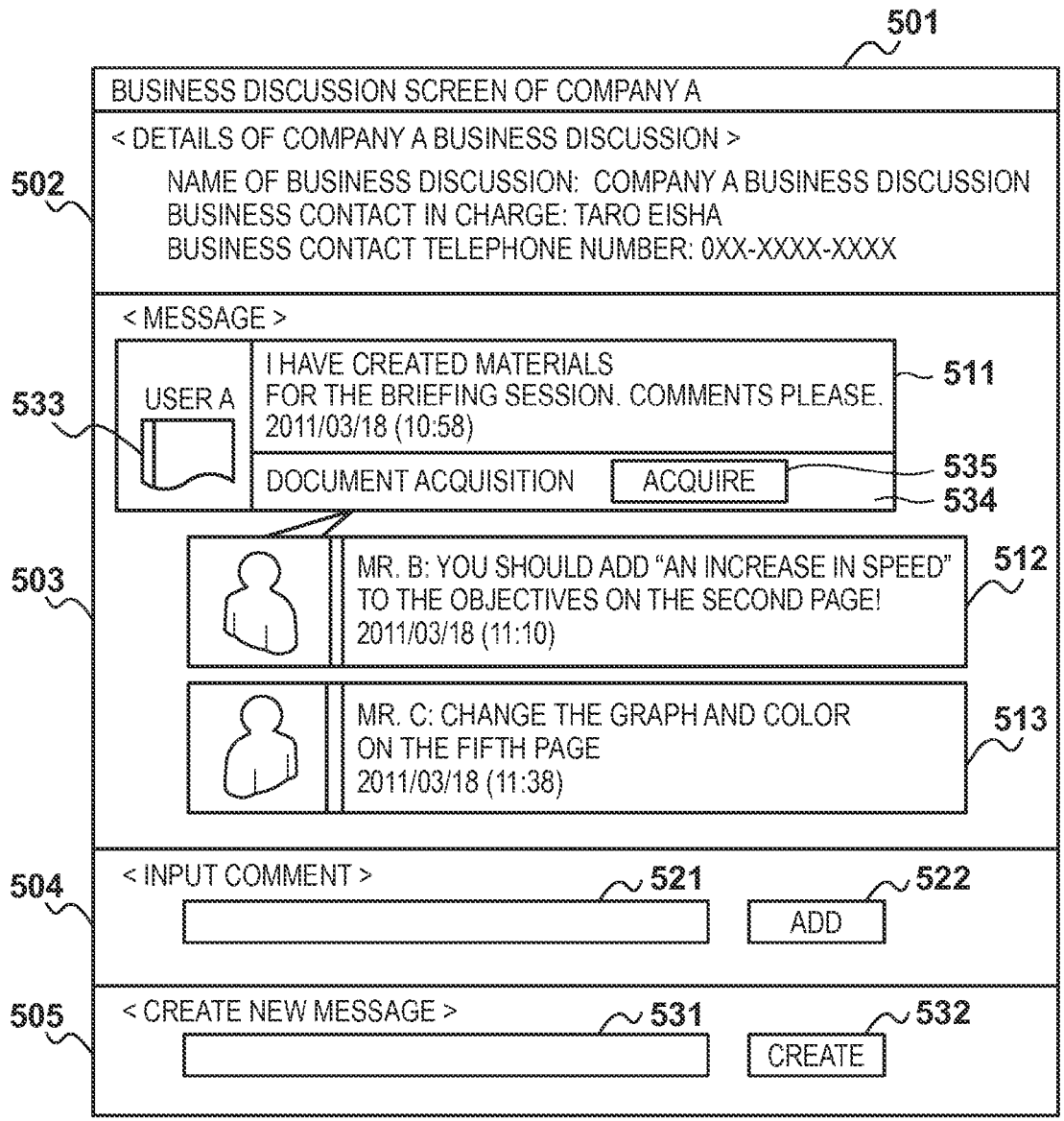
FIG. 5 is a diagram illustrating an example of display of a Web page displayed by accessing a cloud service server from a Web browser than runs on an information processing apparatus according a first embodiment of the present invention.

FIG. 5 is a diagram for describing the microblog function provided by the cloud service server 131 according to a first embodiment of the present invention.

FIG. 5 is a diagram illustrating an example of display of a Web page displayed by accessing the cloud service server 131 from a Web browser that runs on the information processing apparatus 101. Assume that for the purpose of sharing information concerning a specific business discussion, the cloud service server 131 is managing messages or comments regarding information about this business discussion, which is currently ongoing. FIG. 5 shows a business discussion screen 501 of Company A, which displays information relating to a business discussion with Company A. The business discussion screen 501 includes a business discussion details area 502 that displays information relating to the business discussion, namely the name of the business discussion, the business contact in charge and the business contact telephone number, etc. Also included is a message display area 503 for displaying a message and a timeline composed of each comment made to the message. Registered in the message display area 503 are a message 511 from a User A reading "I HAVE CREATED MATERIALS FOR THE BRIEFING SESSION. COMMENTS PLEASE." and an electronic file 533 consisting of the briefing session materials. The message display area 503 displays a comment "YOU SHOULD ADD "AN INCREASE IN SPEED" TO THE OBJECTIVES ON THE SECOND PAGE!" in a comment display area 512, that a User B has sent back as a reply in response to the message 511. Similarly, the message display area 503 displays a comment "CHANGE THE GRAPH AND COLOR ON THE FIFTH PAGE" in a comment display area 513, that a User C has sent back as a reply.

The business discussion screen 501 further includes a comment input area 504. When the user enters a comment in a comment input field 521 and clicks an ADD button 522, a comment-add request is transmitted from the Web browser to the cloud service server 131. Upon receiving this request, the cloud service server 131 registers the entered comment. As a result, when the user accesses the cloud service server 131 using the Web browser, the comment is displayed on the Web browser as in the manner of the comments in the comment display areas 512 and 513 mentioned above.

The business discussion screen 501 further includes a message input area 505. The user enters a message in a message input field 531 and clicks a CREATE button 532, thereby transmitting the created message along with a message-create request from the Web browser to the cloud service server 131. Upon receiving this request, the cloud service server 131 registers the received message. As a result, when the user accesses the cloud service server 131 using the Web browser, the message is displayed as in the manner of the message 511 mentioned above.

An area 534 is for specifying acquisition of the registered electronic file 533. When the user clicks an ACQUIRE button 535, an electronic-file acquisition request is transmitted from the Web browser to the cloud service server 131. Upon receiving this request, the cloud service server 131 executes processing for organizing the comments registered in the timeline and creates an electronic file by inserting the registered comments in or merging them with the first-mentioned electronic file. The details of this processing will be described later. As a result of this processing, an electronic file reflecting the comments that were displayed in the Web browser by the cloud service server 131 is generated and the user is capable of acquiring this electronic file.

Figure 6:
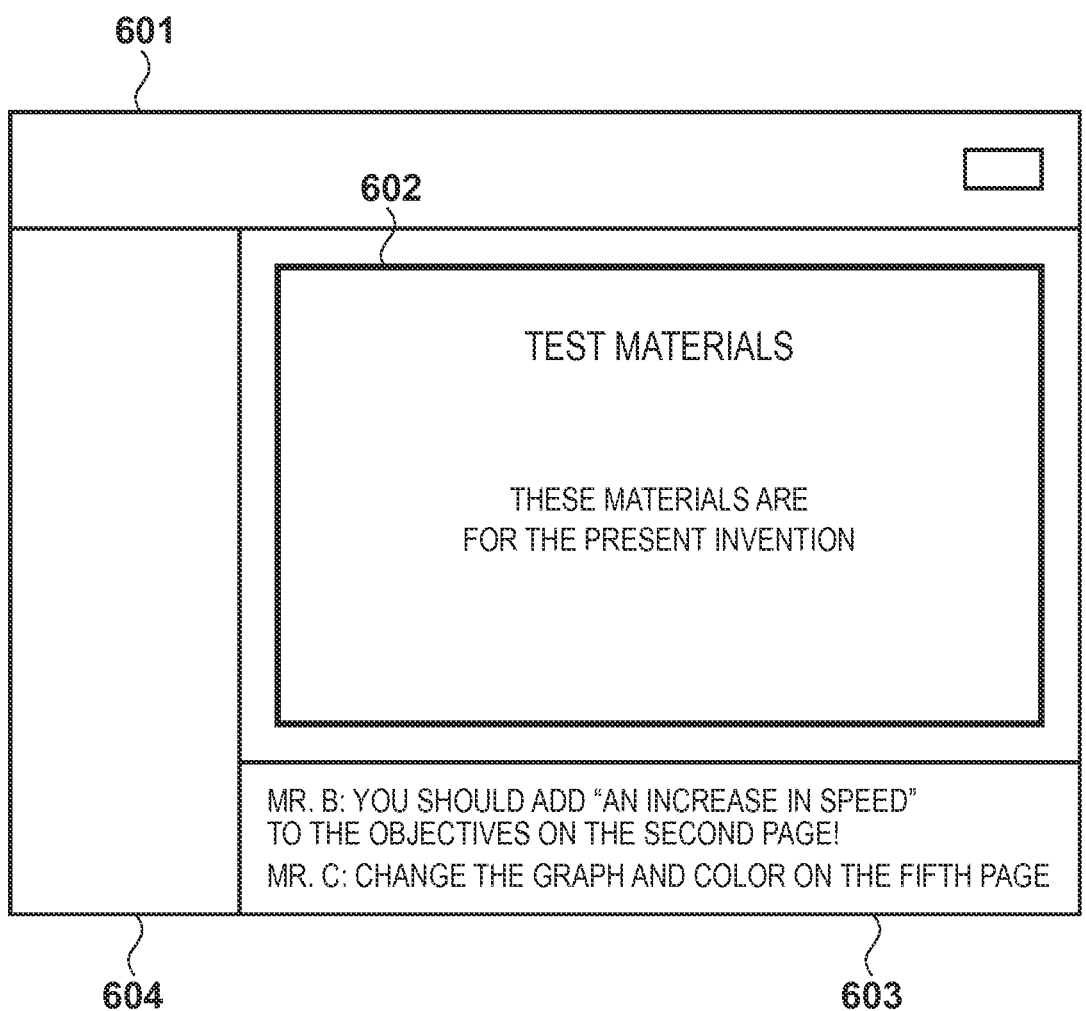
FIG. 6 is a diagram illustrating an example of display of an electronic file, into which comments have been inserted, received from a cloud service server.

FIG. 6 is a diagram illustrating an example of display of an electronic file, into which comments have been inserted, received from the cloud service server 131.

An overall display window 601 is displayed on a terminal 102 such as a personal computer. The overall display window 601 includes a layout editing window 602, a text editing window 603 and a summary display window 604. If the display on the personal computer or the like is a PowerPoint display, then the layout editing window 602 is a slide pane, the text editing window 603 is a note pane and the summary display window 604 is an outline pane.

A display in accordance with the content of layout editing data in the electronic file is presented in the layout editing window 602. Character strings "TEST MATERIALS" and "THESE MATERIALS ARE FOR THE PRESENT INVENTION" are being displayed with regard to the electronic file of FIG. 6 exemplified in the first embodiment. Editing work such as enlarging or reducing and changing the color information of an object rendered by vector rendering data can be performed by the user in the layout editing window 602. It is also possible for the user to save an edited document and to print a page having an appearance in line with that shown in the layout editing window 602.

The content of text editing data in the electronic file is displayed as text data in the text editing window 603. The user can use the content of the text editing window 603 to store auxiliary information such as annotations and remarks being displayed in the layout editing window 602. It is also possible for the user to edit the content of the text editing window 603 as text data.

Figure 7:
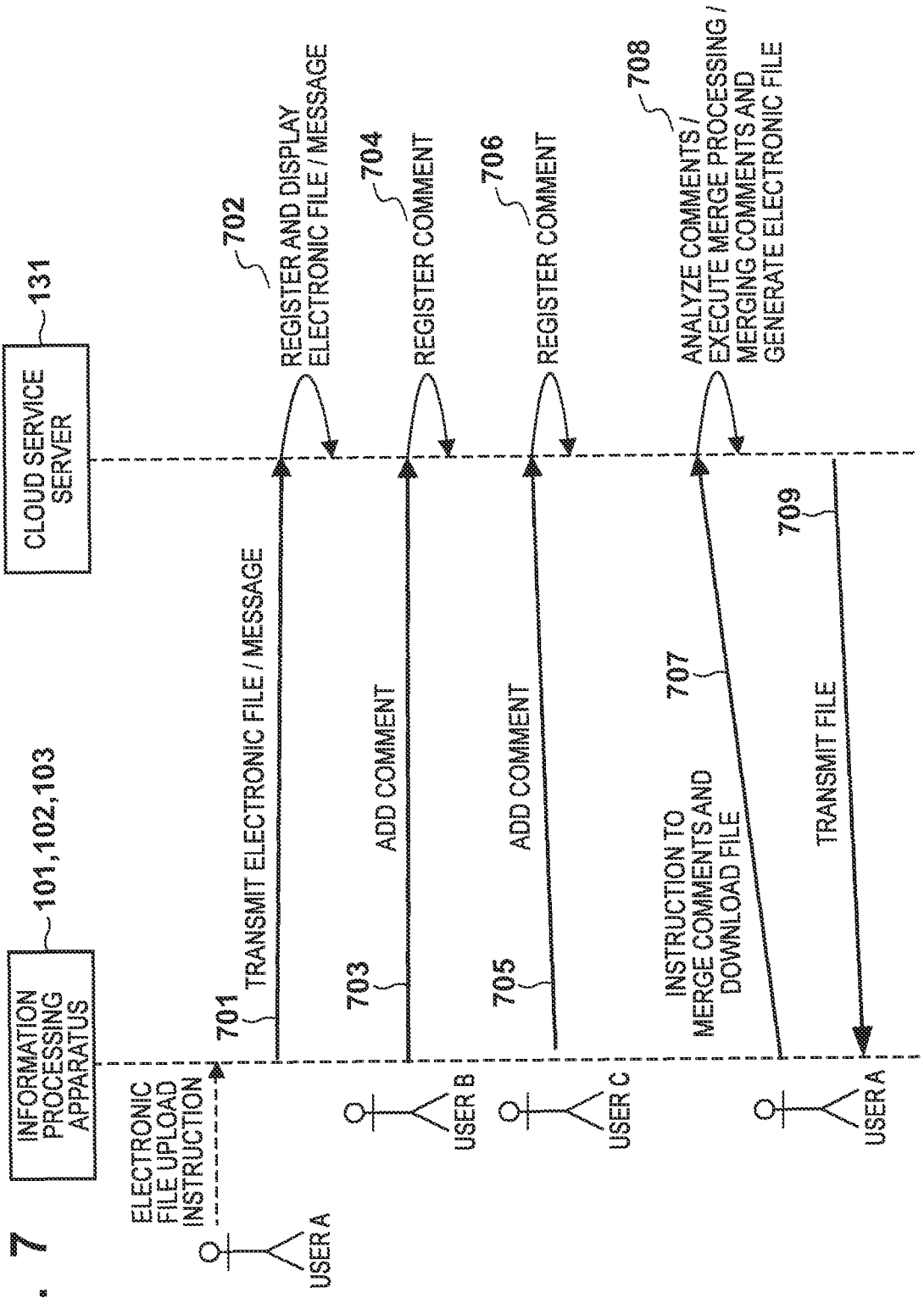
FIG. 7 is a sequence diagram for describing a series of processes executed by an information processing apparatus, personal computer and cloud service server according to the first embodiment of the present invention.

FIG. 7 is a sequence diagram for describing a series of processes executed by the information processing apparatus 101, personal computers 102, 103 and cloud service server 131 according to the first embodiment of the present invention.

First, at 701, uploading of an electronic file is executed in the information processing apparatus 101 in response to an instruction from User A. In upload processing, the electronic file is transmitted from the information processing apparatus 101 to the cloud service server 131. At 702, the cloud service server 131 registers the electronic file, which has been sent from the information processing apparatus 101, in the message display area 503. As a result, the electronic file is displayed as a registered electronic file as indicated at 533 in FIG. 5.

At 703, User B adds a comment from the personal computer 102. When this is done, the added comment is transmitted to the cloud service server 131 by the Web browser of personal computer 102. As a result, the comment transmitted from the personal computer 102 and received by the cloud service server 131 is registered in the comment display area 512 at 704. Then, at 705, User C adds a comment from the Web browser of personal computer 103, whereupon the added comment is transmitted to the cloud service server 131 by the Web browser of personal computer 103. Then, at 706, the comment transmitted from the personal computer 103 and received by the cloud service server 131 is registered in the comment display area 513. Thus, the comments added on by Users B and C are displayed in the comment display areas 512 and 513, respectively, as shown in FIG. 5.

At 707, User A issues an instruction from the information processing apparatus 101 to the effect that he wishes that the electronic file and comments present in the cloud service server 131 be merged and downloaded. Specifically, User A clicks the ACQUIRE button 535 on the Web browser of FIG. 5, which is for merging and downloading the electronic file and comments, thereby sending the cloud service server 131 a request to merge the comments with the electronic file and download the result. Accordingly, at 708, the cloud service server 131 receives from the information processing apparatus 101 the request to merge the comments with the electronic file and to download the result, and executes processing for analyzing the comments of the timeline. The comment analysis processing extracts the comments that have been registered in the comment display areas 512 and 513 shown in FIG. 5. For example, the comment "YOU SHOULD ADD "AN INCREASE IN SPEED" TO THE OBJECTIVES ON THE SECOND PAGE!" is extracted from the comment display area 512. Processing is then executed for merging the comments obtained by this comment analysis processing. The comments thus merged are inserted into the above-mentioned electronic file to thereby create an electronic file in which the comments have been inserted. FIG. 6 illustrates an example in which an electronic file having these inserted comments is displayed. At 709, the cloud service server 131 transmits the electronic file into which the comments have been inserted to the information processing apparatus 101 of User A.

As a result of this series of processes, User A of information processing apparatus 101 is capable of downloading an electronic file into which have been inserted comments that other users input with respect to the uploaded electronic file.

Figure 8:
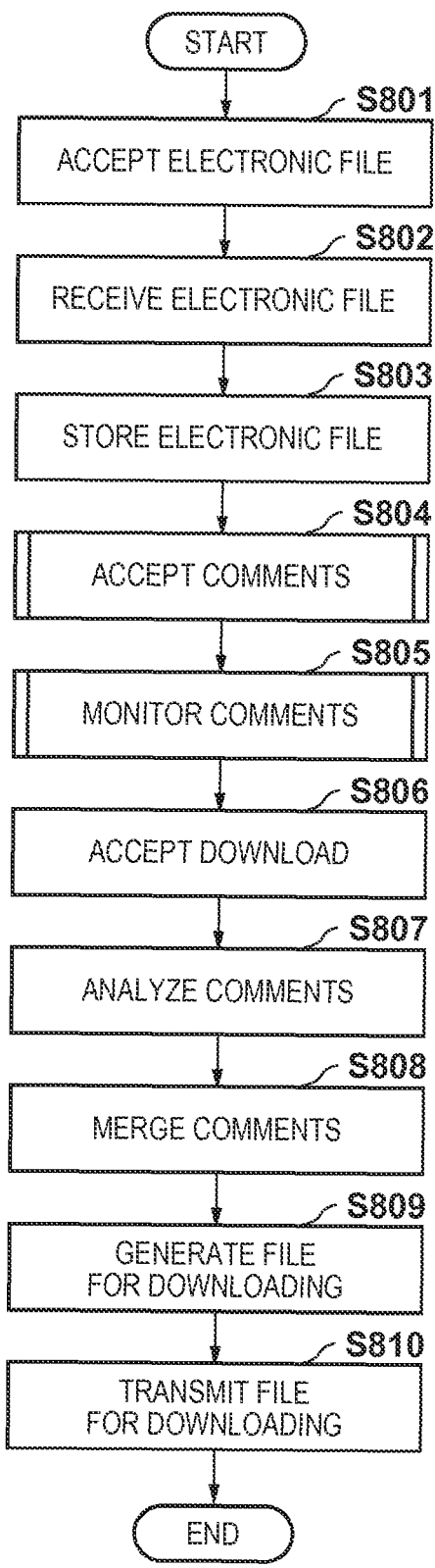
FIG. 8 is a flowchart for describing processing in a cloud service server according to the first embodiment of the present invention.

FIG. 8 is a flowchart for describing processing in a cloud service server according to the first embodiment of the present invention. Here the cloud service server 131 receives and registers an electronic file from the information processing apparatus 101, registers comments, which will be entered from other users with respect to this electronic file, in a microblog and generates an electronic file into which these comments have been inserted. Processing up to the downloading of an electronic file, into which comments have been inserted, to the information processing apparatus 101 will now be described. It should be noted that the program for executing this processing has been installed on the hard-disk drive 314. At the time of execution, the program is expanded in the RAM 313 and executed under the control of the CPU 311.

First, in step S801, in response to an electronic-file upload instruction entered by the user at the information processing apparatus 101, the CPU 311 of cloud service server 131 accepts an electronic-file upload request from the information processing apparatus 101. Here the electronic file will be described taking PowerPoint as an example. Next, in step S802, the CPU 311 of cloud service server 131 receives an electronic file uploaded from the information processing apparatus 101. In step S803, the CPU 311 stores the received electronic file. At this time the CPU 311 correlates this electronic file with a message ID and stores the electronic file in association with the message ID.

Next, in step S804, the CPU 311 enables the writing of comments regarding this electronic file and makes it possible to write the comments in the timeline of the microblog. Control then proceeds to step S805, where the CPU 311 monitors comments added to the timeline. When comments are sent, as indicated at 703 to 706 in FIG. 7, the CPU 311 registers these comments. Then, in step S806, the CPU 311 waits for clicking of the ACQUIRE button 535 in area 534 for acquiring the document in message 511 of FIG. 5. The CPU 311 then accepts the instruction from the ACQUIRE button 535 for downloading the electronic file 533. As a result, control proceeds to step S807 and the CPU 311 analyzes the file comments registered in step S805. Control proceeds to step S808 where the CPU 311 executes processing for merging the analyzed comments. Next, in step S809, the CPU 311 generates a file in which the merged electronic file 533 and comments have been embedded. This file is the electronic file that will be downloaded. It should be noted that the processing of steps S806 to S809 will be described in detail with reference to the flowchart of FIG. 9. Finally, in step S810 in FIG. 8, the CPU 311 downloads the generated electronic file to the information processing apparatus 101.

Figure 9:
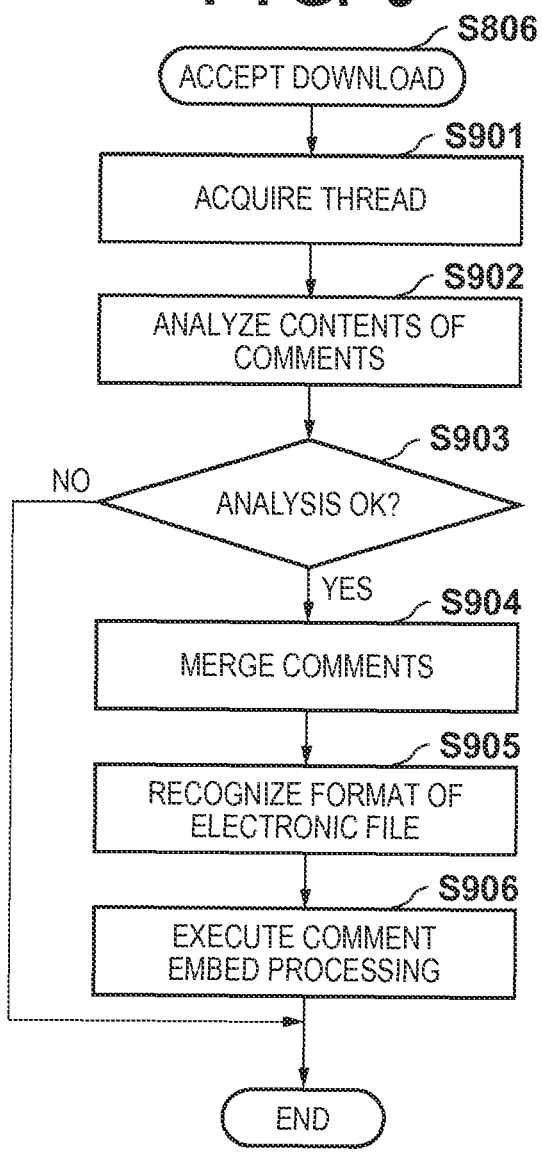
FIG. 9 is a flowchart for describing the details of processing at steps S806 to S809 in the flowchart of FIG. 8 according to the first embodiment.

FIG. 9 is a flowchart for describing the details of processing in steps S806 to S809 in the flowchart of FIG. 8 according to the first embodiment.

First, in step S901, the CPU 311 executes processing, which is based on the message ID, for specifying the comments regarding the electronic file 533. This processing makes it possible to acquire the comments registered with regard to the electronic file 533. Next, in step S902, the CPU 311 executes processing for analyzing the contents of the comments. Since this processing is the same as that described in step S807, it will not be described again. Next, control proceeds to step S903 and the CPU 311 determines whether the analysis performed in step S902 succeeded. If analysis could not be achieved, then the CPU 311 proceeds to the processing of step S809 (FIG. 8) for generating the file for downloading. If it is determined in step S903 that analysis succeeded, then control proceeds to step S904 and the CPU 311 executes processing for merging the comments. This is the same as the processing in step S808 in FIG. 8. Next, in step S905, the CPU 311 recognizes the document format of the electronic file 533. In the first embodiment, the CPU 311 recognizes PowerPoint since the electronic file 533 has been created in PowerPoint. Control then proceeds to step S906, where the CPU 311 executes processing for embedding the comments in PowerPoint. As a result, the comments are displayed in the text editing window 603 as illustrated in FIG. 6.

In accordance with the first embodiment, as described above, the user uploads an electronic file to a microblog function and, when the electronic file is then downloaded, is capable of acquiring this electronic file into which have been inserted comments which pertain to the first-mentioned electronic file and which have been registered in the timeline. Owing to the fact that comments are thus inserted into the electronic file, the user can view comments, which have been registered by other users with regard to the electronic file, when the electronic file is displayed. This enhances user convenience as when performing an operation such as editing of the electronic file.

[Second Embodiment]

Next, in a second embodiment, a case will be described in which processing for inserting comments into an electronic file of a microblog in not executed solely by the cloud service server 131 but in cooperation with the cloud service server 132. It should be noted that the system configuration and configurations of the information processing apparatus 101, personal computers 102, 103 and cloud service servers 131, 132 in the second embodiment are similar to those of the first embodiment and need not be described again.

Figure 10:
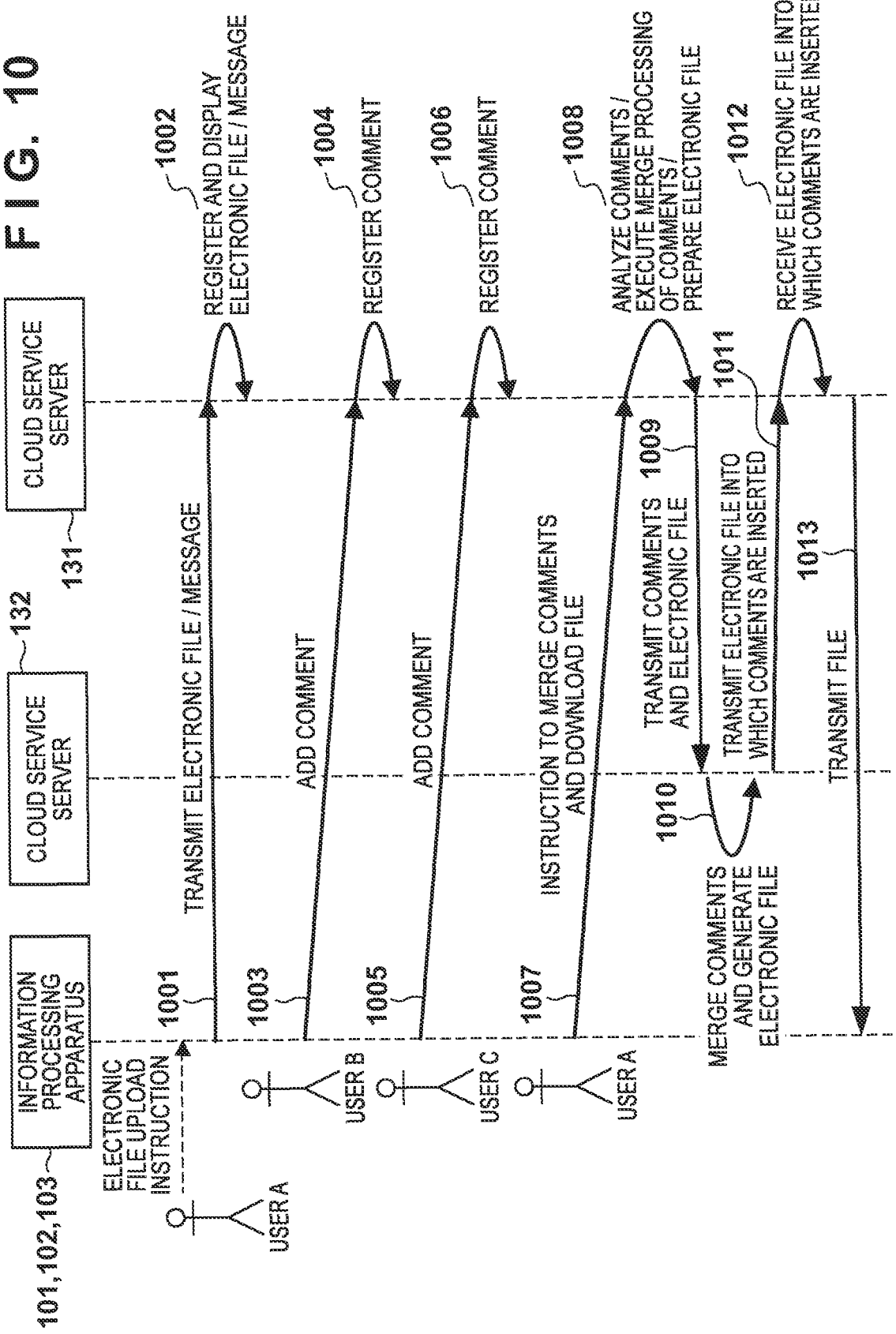
FIG. 10 is a sequence diagram for describing a series of processes executed by an information processing apparatus, personal computer and cloud service servers 131, 132 according to a second embodiment of the present invention.

FIG. 10 is a sequence diagram for describing a series of processes executed by the information processing apparatus 101, personal computers 102, 103 and cloud service servers 131, 132 according to the second embodiment of the present invention.

First, at 1001, uploading of an electronic file is executed in the information processing apparatus 101 in response to an instruction from User A. In upload processing, the electronic file is transmitted from the information processing apparatus 101 to the cloud service server 131. At 1002, the cloud service server 131 registers the electronic file, which has been sent from the information processing apparatus 101, in the message display area 503 and displays it as a registered electronic file.

At 1003, User B adds a comment from the personal computer 102, whereupon the comment is transmitted to the cloud service server 131. At 1004, the comment transmitted from the personal computer 102 and received by the cloud service server 131 is registered in the comment display area 512. At 1005, User C adds a comment from the Web browser of personal computer 103, whereupon the comment is transmitted to the cloud service server 131. Then, at 1006, the comment transmitted from the personal computer 103 and received by the cloud service server 131 is registered in the comment display area 513. The processing thus far is similar to the processing at 701 to 706 of the first embodiment.

Next, at 1007, User A issues an instruction from the information processing apparatus 101 to the effect that he wishes that the electronic file and comments present in the cloud service server 131 be merged and downloaded. Specifically, User A clicks the ACQUIRE button 535 on the Web browser, which is for merging and downloading the electronic file and comments, thereby sending the cloud service server 131 a request to merge the comments with the electronic file and download the result. Accordingly, at 1008, the cloud service server 131 receives from the information processing apparatus 101 the request to merge the comments with the electronic file and to download the result and executes processing for analyzing the comments of the timeline. The comment analysis processing extracts the comments that have been registered in the comment display areas 512 and 513. For example, the comment "YOU SHOULD ADD "AN INCREASE IN SPEED" TO THE OBJECTIVES ON THE SECOND PAGE!" is extracted from the comment display area 512. Processing is then executed for merging the comments which have been obtained by this comment analysis processing.

Next, at 1009, the cloud service server 131 transmits the electronic file and the merged comments to the cloud service server 132 and instructs the cloud service server 132 to insert the merged comments into the electronic file. As a result, at 1010, based upon the received comments and electronic file, the cloud service server 132 inserts the comments into the electronic file and generates an electronic file into which the comments have been inserted. Then, at 1011, the cloud service server 132 sends the cloud service server 131 the generated electronic file into which the comments have been inserted. At 1012, the cloud service server 131 receives the electronic file generated by the cloud service server 132. Then, at 1013, the cloud service server 131 transmits the electronic file into which the comments have been inserted to the information processing apparatus 101 of User A. As a result, User A of information processing apparatus 101 is capable of downloading the electronic file into which comments have been inserted.

Figure 11:
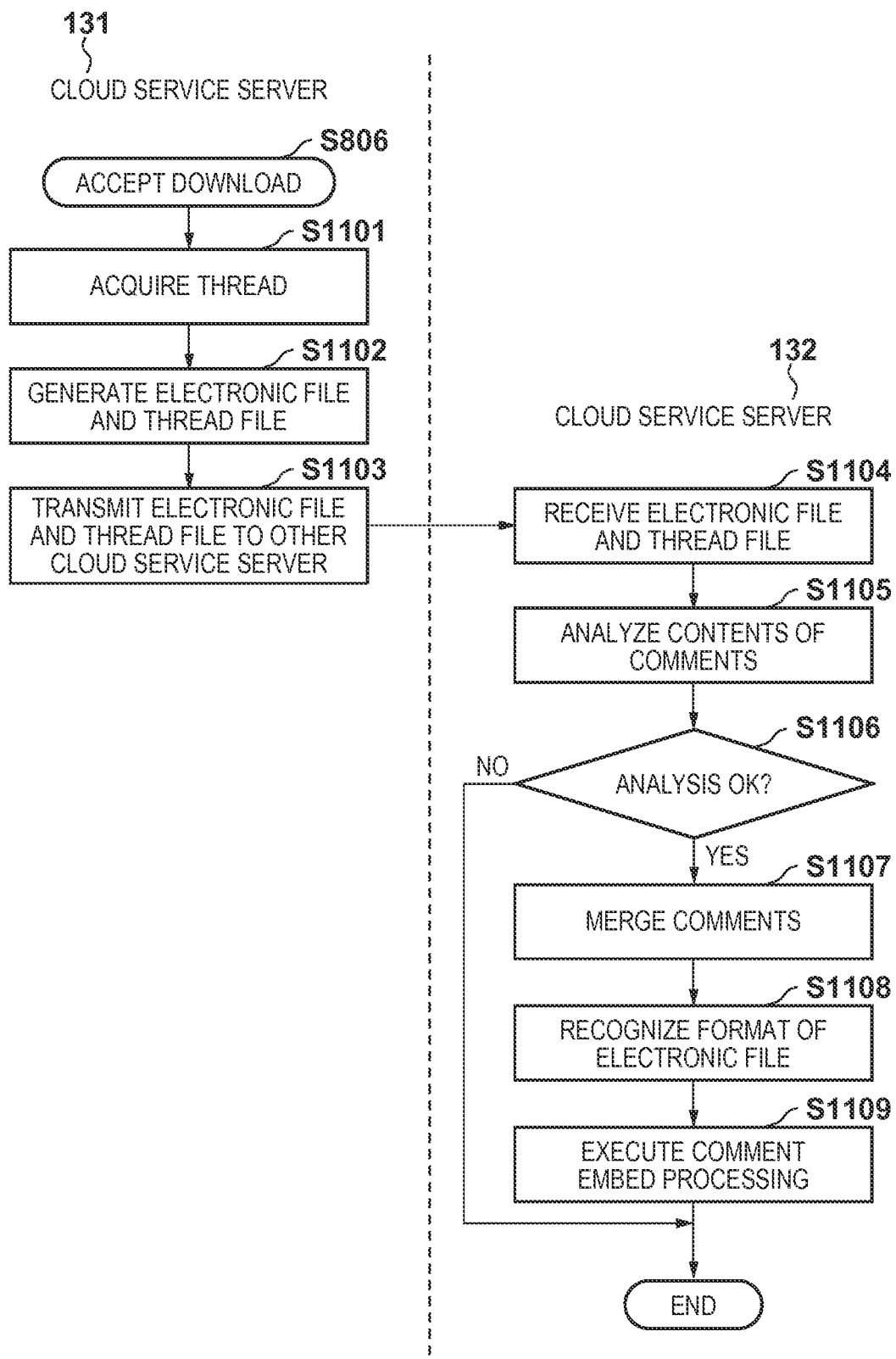
FIG. 11 is a flowchart for describing processing in cloud service servers according to the second embodiment of the present invention.

FIG. 11 is a flowchart for describing processing in the cloud service servers 131, 132 according to the second embodiment. Specifically, FIG. 11 illustrates the following processing: The cloud service server 131 accepts and registers an electronic file from the information processing apparatus 101 and registers comments by a microblog with respect to this electronic file. When a request to merge the comments with the electronic file and download the result is received from the information processing apparatus 101, the electronic file and the comments regarding this electronic file are transmitted from the cloud service server 131 to the cloud service server 132. The cloud service server 132 then generates an electronic file, which is obtained by inserting the comments regarding the first-mentioned electronic file into the first-mentioned electronic file, and transmits the generated electronic file to the cloud service server 131. The electronic file into which the comments have been inserted is then downloaded from the cloud service server 131 to the information processing apparatus 101. FIG. 11 is for describing the processing in steps S806 to S809 of FIG. 8; processing other than that in FIG. 11 is similar to the processing of the first embodiment and need not be described again.

In step S1101, the CPU 311 of cloud service server 131 executes processing for specifying the comments regarding the electronic file based upon the message ID. This processing makes it possible to acquire comments pertinent to the electronic file. Next, control proceeds to step S1102, in which the CPU 311 of cloud service server 131 generates an electronic file and a comment file in which comments regarding this electronic file have been organized. Then, in step S1103, the CPU 311 of cloud service server 131 sends the cloud service server 132 the file, in which the comments have been organized, and the electronic file that were generated in step S1102. Here the cloud service server 131 instructs the cloud service server 132 to insert the comments into the electronic file and transmits the electronic file and the file in which the comments have been organized.

Next, the processing from step S1104 to step S1109 is executed in the cloud service server 132. It should be noted that the processing of steps S1105 to S1109 is the same as the processing of steps S902 to S906 of FIG. 9. In step S1104, the CPU 311 of cloud service server 132 receives the electronic file, the file in which the comments have been organized, and the instruction to insert the comments into the electronic file, all of which have been transmitted from the cloud service server 131. Next, in step S1105, the CPU 311 of cloud service server 132 analyzes the comments in the comment file. Then, in step S1106, the CPU 311 determines whether the analysis performed in step S1105 succeeded. If analysis could not be achieved, then the CPU 311 proceeds to the processing of step S809 for generating the file for downloading. On the other hand, if it is determined that analysis succeeded, then control proceeds to step S1107 and the CPU 311 of cloud service server 132 executes processing for merging the comments. Next, control proceeds to step S1108, where the CPU 311 of cloud service server 132 executes processing for recognizing the document format of the electronic file. In the second embodiment, insertion of comments into PowerPoint is taken as an example. Next, control proceeds to step S1109, where the CPU 311 of cloud service server 132 executes processing for embedding the comments in the electronic file. As a result, the comments are displayed in the text editing window 603 as illustrated in FIG. 6.

In accordance with the second embodiment, as described above, the user, with the cooperation of multiple cloud service servers, uploads an electronic file to a microblog function and can acquire an electronic file that is the result of insertion of comments, which have been registered in a timeline, into the first-mentioned electronic file.

Thus, when the electronic file that has been uploaded is then downloaded, comments from other users will have been inserted into this electronic file. When the electronic file is displayed, therefore, it is possible to view comments registered by other users with regard to this electronic file. This enhances user convenience as when performing an operation such as editing of the electronic file.

[Third Embodiment]

A third embodiment of the present invention will be described next. In the third embodiment an example will be described in which processing for inserting comments into an electronic file of a microblog is executed by the cloud service server 132. It should be noted that the system configuration and configurations of the information processing apparatus 101, personal computers 102, 103 and cloud service servers 131, 132 in the third embodiment are similar to those of the first embodiment and need not be described again.

Figure 12:
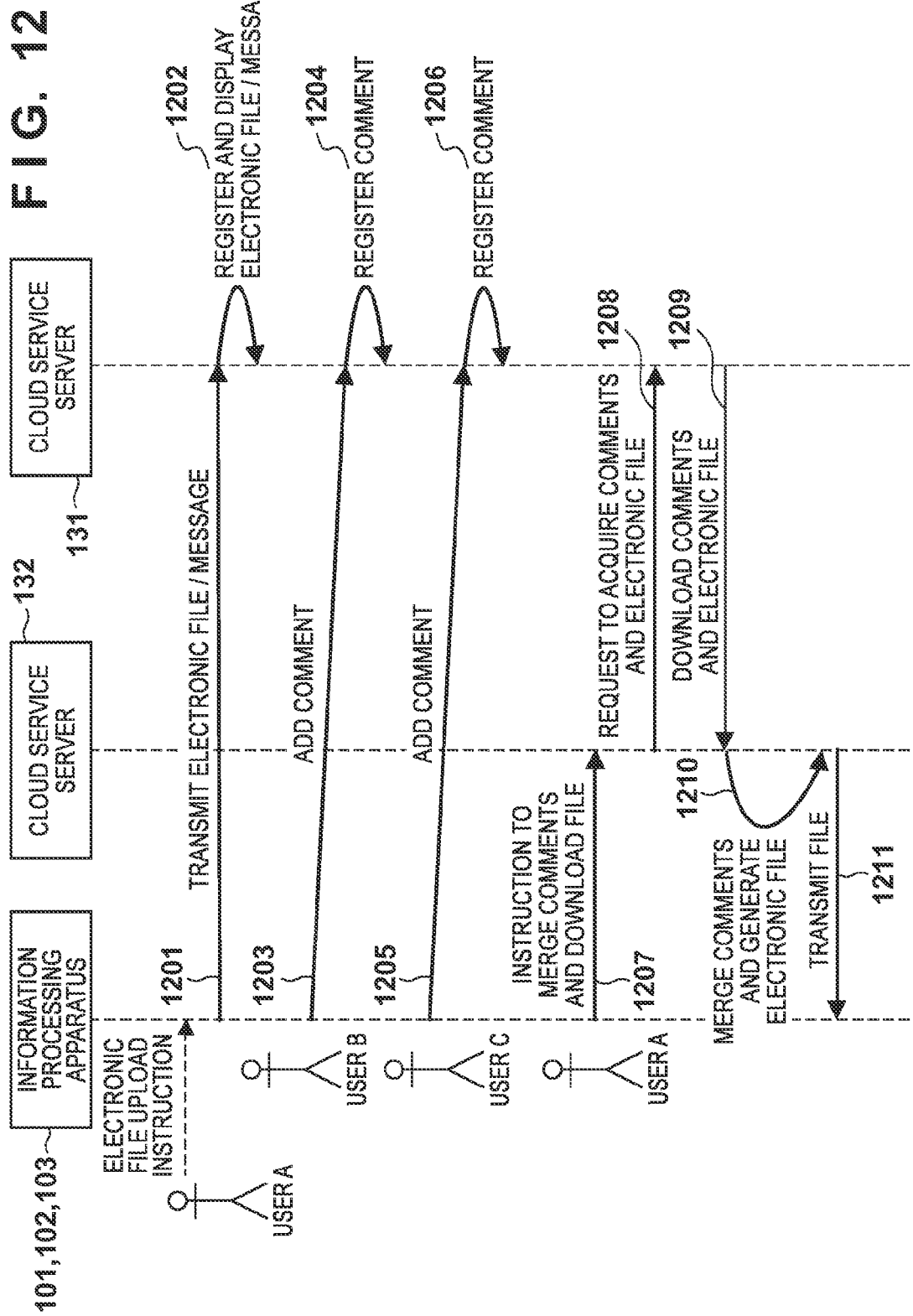
FIG. 12 is a sequence diagram for describing a series of processes executed by an information processing apparatus, personal computer and cloud service servers 131, 132 according to a third embodiment of the present invention.

FIG. 12 is a sequence diagram for describing a series of processes executed by the information processing apparatus 101, personal computers 102, 103 and cloud service servers 131, 132 according to the third embodiment of the present invention.

First, at 1201, uploading of an electronic file is executed in the information processing apparatus 101 in response to an instruction from User A. In upload processing, the electronic file is transmitted from the information processing apparatus 101 to the cloud service server 131. At 1202, the cloud service server 131 registers the electronic file, which has been sent from the information processing apparatus 101, in the message display area 503 and displays the electronic file as indicated at 533 in FIG. 5. Next, at 1203, User B adds a comment to this electronic file from the Web browser of personal computer 102, whereupon the comment is transmitted to the cloud service server 131. As a result, at 1204, the comment transmitted from the personal computer 102 and received by the cloud service server 131 is registered in the comment display area 512. At 1205, User C adds a comment to this electronic file from the Web browser of personal computer 103, whereupon the comment is transmitted to the cloud service server 131. Then, at 1206, the comment transmitted from the personal computer 103 and received by the cloud service server 131 is registered in the comment display area 513.

Next, at 1207, User A issues an instruction from the information processing apparatus 101 to the cloud service server 132 to the effect that he wishes that the electronic file in the cloud service server 131 and the comments that have been registered in the comment display area be merged and downloaded. Here a comment instructing that comments are to be inserted into the electronic file is made in the message area of the timeline. For example, the comment in the timeline is a written entry that links to the cloud service server 132. By clicking this link, the cloud service server 132 at 1208 requests the cloud service server 131 to acquire this electronic file and the comments regarding this electronic file. The electronic file and comments are specified based upon the message ID.

Accordingly, at 1209, the cloud service server 131 responds to the acquisition request received from the cloud service server 132 at 1208 and makes it possible for the cloud service server 132 to download the electronic file and comments. Then, at 1210, the cloud service server 132 executes processing for analyzing the downloaded comments of the timeline. The processing for analyzing the comment extracts the comments that have been registered in the comment display areas 512 and 513. For example, the comment "YOU SHOULD ADD "AN INCREASE IN SPEED" TO THE OBJECTIVES ON THE SECOND PAGE!" is extracted from the comment display area 512. Processing is then executed for merging the comments thus obtained by the comment analysis processing. Further, the cloud service server 132 inserts the analyzed comments into the electronic file and generates an electronic file into which the comments have been inserted. FIG. 6 illustrates an example in which the electronic file having the inserted comments is displayed in PowerPoint.

At 1211, the cloud service server 132 sends the information processing apparatus 101 of User A the electronic file into which the comments have been inserted. As a result, the information processing apparatus 101 of User A is capable of downloading the electronic file into which the comments have been inserted.

Figure 13:
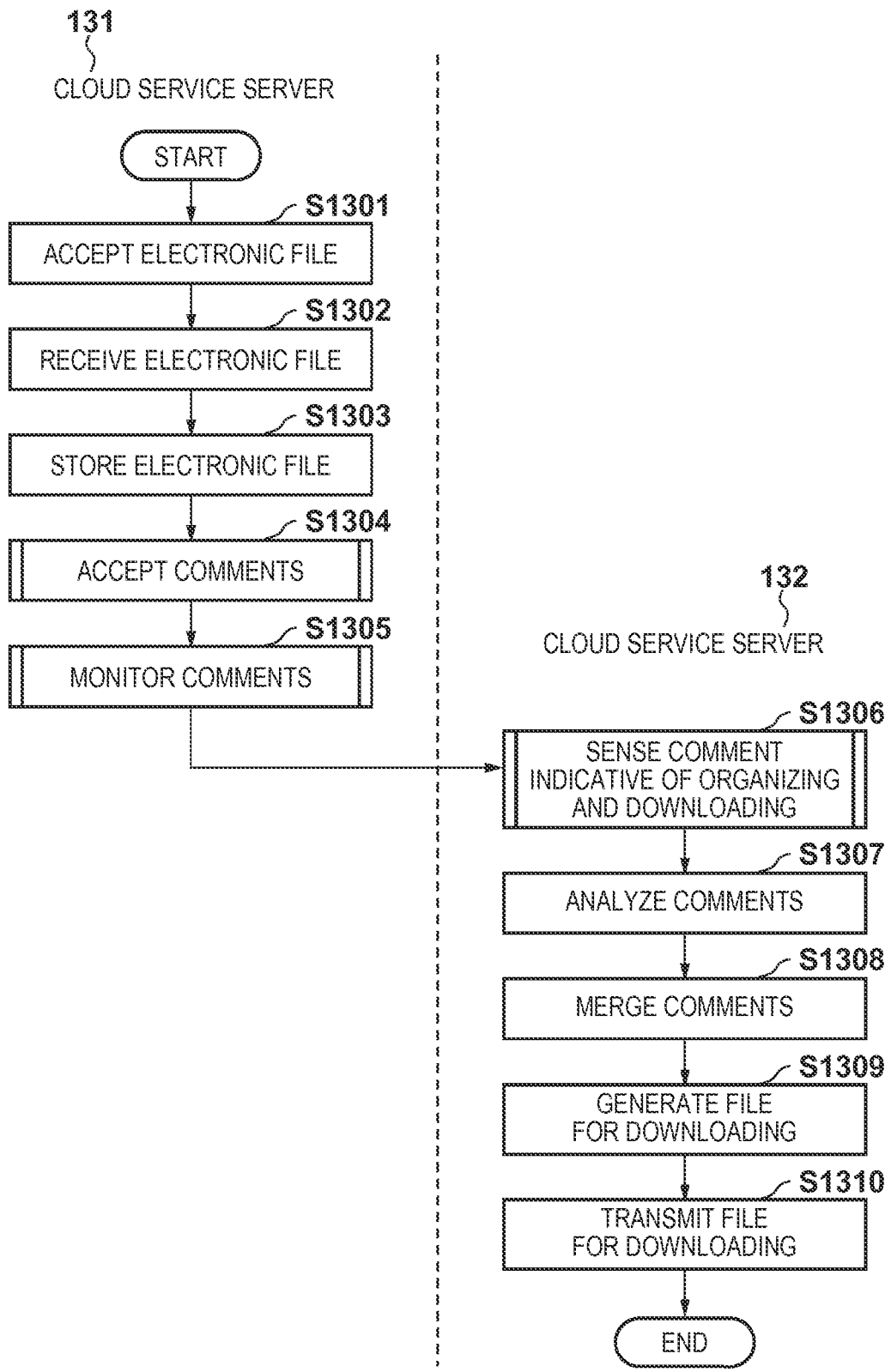
FIG. 13 is a flowchart for describing processing executed by cloud service servers 131, 132 according to the third embodiment.

FIG. 13 is a flowchart for describing processing in the cloud service servers 131, 132 according to the second embodiment. Specifically, FIG. 13 illustrates the following processing: The cloud service server 131 accepts an electronic file from the information processing apparatus 101 and registers the electronic file in the cloud service server 131. The cloud service server 131 then registers comments to be added by the microblog to this electronic file, and the cloud service server 132 acquires this electronic file, as well as comments regarding this electronic file, from the cloud service server 131. The cloud service server 132 then generates an electronic file, which is obtained by inserting the comments regarding the first-mentioned electronic file into the first-mentioned electronic file, and downloads the generated electronic file to the information processing apparatus 101.

In step S1301, in response to an electronic-file upload instruction entered by the user at the information processing apparatus 101, the CPU 311 of cloud service server 131 accepts a request to upload the electronic file. Here the electronic file will be described taking PowerPoint as an example. Next, in step S1302, the CPU 311 of cloud service server 131 receives an electronic file uploaded from the information processing apparatus 101. In step S1303, the CPU 311 of the cloud service server 131 receives the electronic file uploaded from the information processing apparatus 101. At this time the CPU 311 correlates this electronic file with a message ID and stores the electronic file in association with the message ID. Next, in step S1304, the CPU 311 of cloud service server 131 enables the writing of comments regarding this electronic file and makes it possible to write the comments in the timeline of the microblog. Then, in step S1305, the CPU 311 of the cloud service server 131 monitors comments added to the timeline. The processing thus far corresponds to the processing of 1201 to 1206 in FIG. 12.

In step S1306, the CPU 311 of cloud service server 132 senses that a comment, the content of which indicates that an electronic file and comments are to be organized, has been entered as the message 511 in FIG. 5. From this point onward the cloud service server 132 executes the processing of steps S1306 to S1310. In step S1307, the CPU 311 of cloud service server 132 analyzes comments that have been added with regard to the electronic file. In step S1308, the CPU 311 of cloud service server 132 then analyzes the comments regarding this electronic file and merges the comments. Next, control proceeds to step S1309, where the CPU 311 of cloud service server 132 generates a file in which the merged electronic file 533 and comments have been embedded. This file is the electronic file that will be downloaded. It should be noted that the processing of steps S1306 to S1309 will be described later with reference to the flowchart of FIG. 14. Finally, in step S1310 in FIG. 13, the CPU 311 downloads the generated electronic file to the information processing apparatus 101.

FIG. 14 is a flowchart for describing the details of processing in steps S1306 to S1309 in the flowchart of FIG. 13 according to the third embodiment.

In step S1401, the CPU 311 of cloud service server 132 requests the cloud service server 131 to acquire the electronic file and the comments regarding this electronic file. Since User A has written a link in the message for the purpose of acquiring the electronic file and comments, the CPU 311 of cloud service server 132 recognizes the message ID when the link is clicked. The CPU 311 of cloud service server 132 then acquires the electronic file and comments related to the acquired message ID. Next, control proceeds to step S1402, where the CPU 311 of cloud service server 132 analyzes the acquired comments. Then, in step S1403, the CPU 311 of cloud service server 132 determines whether the analysis in step S1402 succeeded. If analysis could not be achieved, then the CPU 311 of cloud service server 132 proceeds to the processing of step S1404 and executes processing for merging the comments. Next, control proceeds to step S1405 and the CPU 311 of cloud service server 132 executes processing for recognizing the document format of the electronic file. In the third embodiment, insertion of comments into PowerPoint is taken as an example. Next, control proceeds to step S1406, where the CPU 311 of cloud service server 132 executes processing for embedding the comments in the electronic file. Here the CPU 311 of cloud service server 132 executes embedding processing in such a manner that the comments will be displayed in the text editing window 603 in the manner shown in FIG. 6.

In accordance with the third embodiment, as described above, a cloud service server other than a cloud service server providing a microblog function makes it possible for comments to an electronic file registered in a timeline to be inserted into this electronic file and downloaded. As a result, a user is capable of uploading an electronic file to a microblog function and of acquiring and displaying an electronic file into which have been inserted comments that were input with respect of the first-mentioned electronic file. As a result, by displaying the electronic file, it becomes possible to view comments from other users that were input with regard to this electronic file. This enhances user convenience as when performing an operation such as editing of the electronic file.

In accordance with the foregoing embodiments, as described above, when an electronic file is shared in an environment that utilizes a microblog function, comments from other users regarding this electronic file can be reflected in this electronic file and viewed.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-236476, filed Oct. 27, 2011, which is hereby incorporated by reference herein in its entirety.

What is claimed is:

1. An information processing system comprising:
a memory configured to store an electronic content transmitted by an information processing apparatus;
a first reception unit that receives comments posted to the electronic content;
a management unit that manages comments in accordance with a time order;
a first transmitting unit that transmits, to the information processing apparatus, a screen including (a) the electronic content, (b) the comments, and (c) a key for inputting an instruction for downloading the electronic content as a file;
a second reception unit that receives, from the information processing apparatus, the instruction for downloading the electronic content as a file, the instruction being received via the key included in the screen provided by the first providing unit;
an obtaining unit that obtains the comments posted to the electronic content according to the instruction received by the second reception unit;
a generating unit that generates an electronic file by executing merge processing of the comments and the electronic content; and
a second transmitting unit that transmits, to the information processing apparatus, the electronic file generated by executing merge processing of the comments and the electronic content;
wherein the electronic content and the comments are displayed by the information processing apparatus based on the electronic file provided by the second transmitting unit, and then the electronic content and the comments are printed based on the electronic file provided by the second transmitting unit; and
wherein a processor is included in the information processing system.

2. The information processing system according to claim 1, wherein the first reception unit receives the comments from a user other than a user of the information processing apparatus.

3. An information processing system comprising:
- a memory configured to store an electronic content transmitted by an information processing apparatus;
- a first reception unit that receives comments posted to the electronic content;
- a management unit that manages comments in accordance with a time order;
- a first transmitting unit that transmits, to the information processing apparatus, a screen including (a) the electronic content, (b) the comments, and (c) a key for instructing for downloading the electronic content as a file;
- a second reception unit that receives, from the information processing apparatus, the instruction for downloading the electronic content as a file, the instruction being received via the key included in the screen provided by the first providing unit;
- an obtaining unit that obtains the comments posted to the electronic content according to the instruction received by the second reception unit;
- a request unit that requests generating an electronic file by executing merge processing of the comments and the electronic content; and
- a second transmitting unit that transmits, to the information processing apparatus, the electronic file generated, in response to a request by the request unit, by executing merge processing of the comments and the electronic content,
- wherein the electronic content and the comments are displayed by the information processing apparatus based on the electronic file provided by the second transmitting unit, and then the electronic content and the comments are printed based on the electronic file provided by the second transmitting unit; and
- wherein a processor is included in the information processing system.

4. The information processing system according to claim 3, wherein the first reception unit receives the comments from a user other than a user of the information processing apparatus.

5. The information processing system according to claim 3, further comprising an adding unit configured to add the comments obtained by the obtaining unit to the electronic content based on the request by the request unit.

6. A service providing method comprising the steps of:
- storing an electronic content transmitted by an information processing apparatus;
- receiving comments posted to the electronic content;
- managing comments in accordance with a time order;
- transmitting, to the information processing apparatus, a screen including (a) the electronic content, (b) the comments, and (c) a key for inputting an instruction for downloading the electronic content as a file;
- receiving, from the information processing apparatus, the instruction for downloading the electronic content as a file, the instruction being received via the key included in the provided screen;
- obtaining the comments posted to the electronic content according to the received instruction;
- generating an electronic file by a executing merge processing of the comments and the electronic content; and
- transmitting, to the information processing apparatus, the electronic file generated by executing merge processing of the comments and the electronic content,
- wherein the electronic content and the comments are displayed by the information processing apparatus based on the transmitted electronic file, and then the electronic content and the comments are printed based on the transmitted electronic file.

7. An information processing method comprising the steps of:
- storing an electronic content transmitted by an information processing apparatus;
- receiving comments posted to the electronic content;
- managing comments in accordance with a time order;
- transmitting, to the information processing apparatus, a screen including (a) the electronic content, (b) the comments, and (c) a key for inputting an instruction for downloading the electronic content as a file;
- receiving, from the information processing apparatus, the instruction for downloading the electronic content as a file, the instruction being received via the key included in the provided screen;
- obtaining the comments posted to the electronic content according to the received instruction;
- requesting generating an electronic file by executing merge processing of the comments and the electronic content; and
- transmitting, to the information processing apparatus, the electronic file generated, in response to a request in the requesting step, by executing merge processing of the comments and the electronic content,
- wherein the electronic content and the comments are displayed by the information processing apparatus based on the transmitted electronic file, and then the electronic content and the comments are printed based on the transmitted electronic file.

8. A non-transitory computer-readable storage medium storing a program for causing a computer to execute the method defined by claim 6.

9. A non-transitory computer-readable storage medium storing a program for causing a computer to execute the method defined by claim 7.

10. A server comprising:
- a memory configured to store an electronic content transmitted by an information processing apparatus;
- a first reception unit that receives comments posted to the electronic content;
- a management unit that manages comments in accordance with a time order;
- a first transmitting unit that transmits, to the information processing apparatus, a screen including (a) the electronic content, (b) the comments, and (c) a key for inputting an instruction for downloading the electronic content as a file;
- a second reception unit that receives, from the information processing apparatus, the instruction for downloading the electronic content as a file, the instruction being received via the key included in the screen provided by the first providing unit;
- an obtaining unit that obtains the comments posted to the electronic content according to the instruction received by the second reception unit;
- a generating unit that generates an electronic file by executing merge processing of the comments and the electronic content; and
- a second transmitting unit that transmits, to the information processing apparatus, the electronic file generated by executing merge processing of the comments and the electronic content;
- wherein the electronic content and the comments are displayed by the information processing apparatus based on the electronic file provided by the second transmitting unit, and then the electronic content and the comments are printed based on the electronic file provided by the second transmitting unit; and wherein a processor is included in the server.

11. The server according to claim 10, wherein the first reception unit receives the comments from a user other than a user of the information processing apparatus.

12. A server comprising:

a memory configured to store an electronic content transmitted by an information processing apparatus;

a first reception unit that receives comments posted to the electronic content;

a management unit that manages comments in accordance with a time order;

a first transmitting unit that transmits, to the information processing apparatus, a screen including (a) the electronic content, (b) the comments, and (c) a key for instructing for downloading the electronic content as a file;

a second reception unit that receives, from the information processing apparatus, the instruction for downloading the electronic content as a file, the instruction being received via the key included in the screen provided by the first providing unit;

an obtaining unit that obtains the comments posted to the electronic content according to the instruction received by the second reception unit;

a request unit that requests generating an electronic file by executing merge processing of the comments and the electronic content; and a second transmitting unit that transmits, to the information processing apparatus, the electronic file generated, in response to a request by the request unit, by executing merge processing of the comments and the electronic content, wherein the electronic content and the comments are displayed by the information processing apparatus based on the electronic file provided by the second transmitting unit, and then the electronic content and the comments are printed based on the electronic file provided by the second transmitting unit; and wherein a processor is included in the server.

13. The server according to claim 12, wherein the first reception unit receives the comments from a user other than a user of the information processing apparatus.

14. The server according to claim 12, further comprising an adding unit configured to add the comments obtained by the obtaining unit to the electronic content based on the request by the request unit.

* * * * *